Sept. 5, 1972   H. R. HELLSTROM   3,689,458
QUICK-OPENING FULCRUM PACKAGE

Filed March 23, 1970   2 Sheets-Sheet 1

INVENTOR
Harold R. Hellstrom
BY
Buell Blenko Ziesenheim
HIS ATTORNEYS

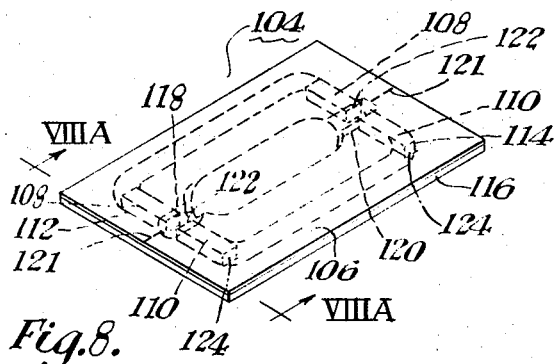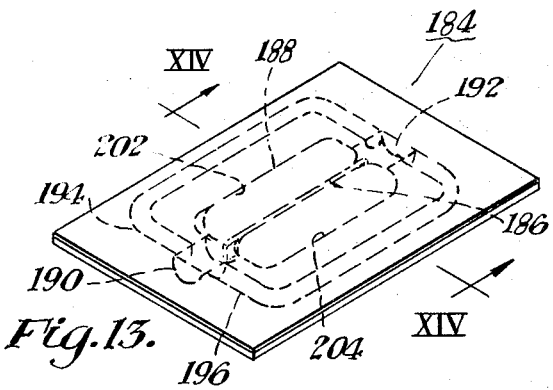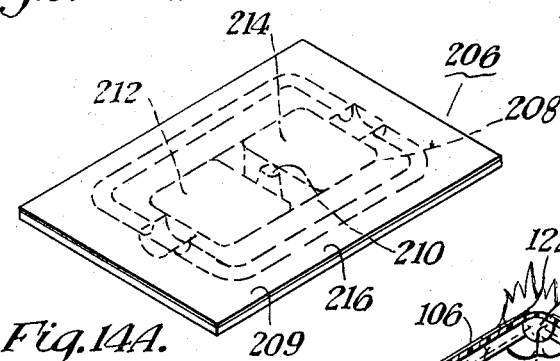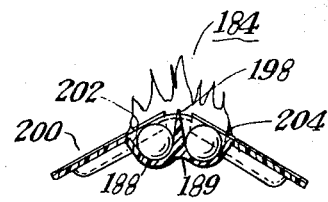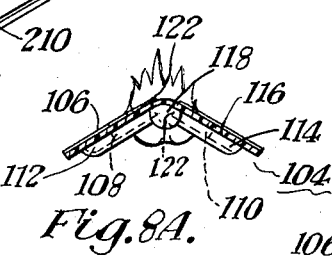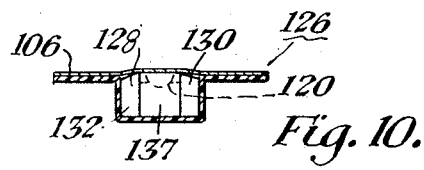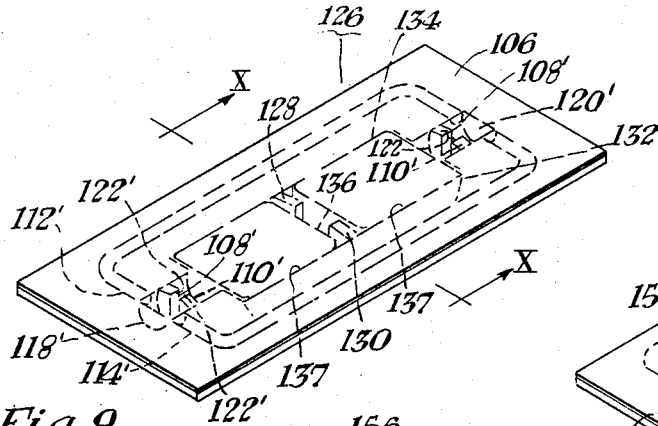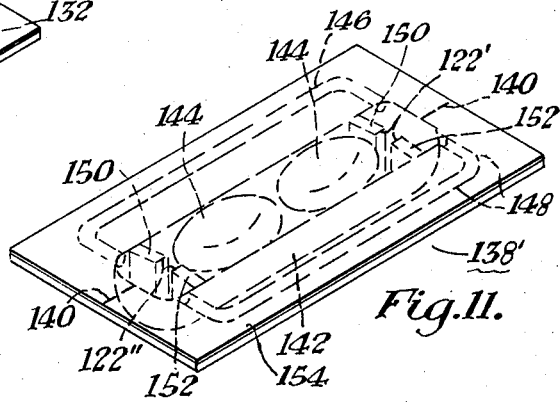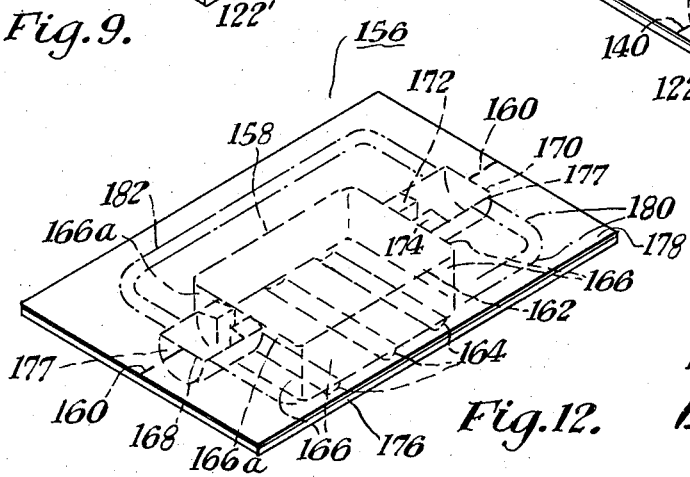

United States Patent Office 3,689,458
Patented Sept. 5, 1972

3,689,458
QUICK-OPENING FULCRUM PACKAGE
Harold Richard Hellstrom, 5245 Center Ave.,
Pittsburgh, Pa. 15232
Filed Mar. 23, 1970, Ser. No. 21,628
Int. Cl. B65d *83/00*
U.S. Cl. 206—56 AA                        23 Claims

ABSTRACT OF THE DISCLOSURE

A quick opening package comprises a base member, at least one elongated pocket on the base member, a frangible layer on the base member and secured thereto generally around the pocket for enclosing an item contained therein. Generally apposed and angulatable portions of the base member are strengthened such that an angulation fold region extending generally between the base member portions is defined thereby. A stiffening arrangement is secured to the base member and to the pocket but only at an end portion thereof to aid in spreading the pocket for development of rupturing forces in the frangible layer upon angulation of the package and to concentrate the opening forces at the pocket end portion.

---

The present invention relates to angulatable blister packages generally of the types disclosed and claimed in my copending applications entitled Quick-Opening Package, Ser. No. 765,097 (no Pat. No. 3,472,367) and Quick-Opening Blister Packets, Ser. No. 725,610 (now Pat. No. 3,472,368). More particularly, my invention includes a fulcrum arrangement to facilitate angulation of the package and in certain arrangements of the invention to initiate parting of a frangible member forming part of the package.

The advantages of a quick-opening package for various types of items have been covered in my aforementioned patents and also in my earlier filed application entitled Individualized Dispensing Packages, Ser. No. 716,554, filed Mar. 26, 1968, now Pat. No. 3,540,579. The package of the present invention is likewise adaptable to one handed opening operations although two hands can be employed depending upon the size and/or stiffness of the package or its structural materials. In either opening procedure, as in my aforementioned patents and applications, the advantages of quick opening without spillage or contamination of the packaged contents is realized with a simple but effective structure. In addition, my novel packages can be made relatively large or relatively small depending upon the size of specific items to be packaged therein. Liquids, as well as granular or powdered solids, also can be packaged and the contained item, whether fluid or solid, can be readily inspected through the package when conveniently fabricated from transparent components. The packages, moreover, are provided with adequate flat areas for printing or labeling.

An important aspect of the present invention is the provision of an angulatable, blister type package, in which the angulation fold is performed more or less separately or outwardly of the blister. That is to say, the package of the present invention is angulated more or less around the blister component. More importantly the opening forces are concentrated at one or both ends of the blister or pocket. The item contained in the blister is not necessarily used for the application of opening forces to a frangible member covering the blister and likewise forming part of the package. Depending on the specific application of the invention, however, the item can be so used. The blister, therefore, is not limited to the depth of the contained item and opening forces need not be applied to the contained item. Thus, the contents of the package do not necessarily have to be solid, but can be liquid or other free-flowing material. Most importantly opening forces need not be applied to delicate or fragile items.

As the blister itself does not enter substantially into the angulation of the package, the domed effect of the blister, according to the present invention, does not resist angulation of the package. With the angulation fold extending around the blister rather than through the blister, the potential resistance of the blister dome to opening forces is eliminated. The required complement of opening forces is reduced further, when the frangibility-enhancing or force-concentrating feature of my invention is put to use.

I am aware of a number of prior patents in the field of individualized and related packages, of which the U.S. patents to Sparks 3,207,299 and Hoag 2,499,313 are possibly of greater interest. Neither of these prior packages, however, define an angulation fold line extending generally around an item-containing pocket. The Sparks package is bent between a pair of item-containing pockets. The Hoag dispenser, on the other hand, apparently requires a number of closely spaced and parallel pockets which can be only partially filled. The latter package is bent across, but not around, the array of parallel pockets in their unfilled areas. Neither reference provides rupture-initiating means within an item containing pocket nor means for enhancing the leverage for angulating the package, as contemplated by other features of my invention. Other references are set forth in my aforementioned application and issued patents, but likewise do not disclose these and other features of my invention.

I accomplish these desirable results by providing a quick-opening package comprising a base member, at least one elongated pocket on said base member, a frangible layer on said base member and secured thereto generally around said pocket for enclosing an item contained therein, means for strengthening generally apposed and angulatable portions of said base member, said strengthening means in addition upon angulation of said portions defining an angulation fold along a line extending generally between said portions, said strengthening means including stiffening means secured to said base member and to said pocket but only at an end portion thereof to aid in spreading said pocket to develop rupturing forces in said frangible layer upon angulation of said package and to concentrate said forces at said pocket end portion.

I also desirably provide a quick opening sealed package comprising a base member having a pocket thereon, a frangible layer secured to said base member and sealed thereto about said pocket for enclosing an item contained in said pocket, means for strengthening angulatable portions of said base member, said strengthening means defining an angulation fold upon angulation of said base member, said pocket having a restricted extension at at least one side of said pocket, and said fold intersecting said pocket extension upon angulation of said portions to concentrate opening forces at said extension and to initiate rupturing of said layer.

I also desirably provide a similar package wherein said end portions are reduced extensions of said pocket.

I also desirably provide a similar package wherein said stiffening means are extended to points within said pocket and juxtaposed to said frangible layer to aid in rupturing said frangible layer upon said angulation.

I also desirably provide a similar package wherein rupture initiating means are mounted on an inner wall surface of said pocket and are juxtaposed to said frangible layer to initiate rupture therein upon angulation of said package.

I also desirably provide a similar package wherein said rupture initiating means include a pair of edged members extended from apposing sides of said pocket end portions or extensions thereof toward one or more angulation fold lines for lengthening the effective leverage arms of said package.

I also desirably provide a similar package wherein said strengthening means include a pair of apposed, U-shaped ridge members adhered to one of said layers and together substantially spacedly surrounding said pocket, the ends of each ridge member being adjoined respectively to opposite end portions or to extensions of the pocket.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings, I have shown certain presently preferred embodiments of the invention and have illustrated certain presently preferred methods of practicing the same, wherein:

FIG. 8 is an isometric view of a further modification of my package to incorporate means for enhancing the frangibility of a package component;

FIG. 8A is a cross sectional view of the package of FIG. 8 and taken generally along reference line VIIIA—VIIIA thereof, but showing the package in its opened condition;

FIG. 9 is an isometric view of a novel package having a further modification of frangibility enhancing means;

FIG. 10 is a cross-sectional view of the package structure of FIG. 9 and taken along reference line X—X thereof;

FIG. 11 is an isometric view of yet another form of my novel quick-opening package;

FIG. 12 is an isometric view of a still further modification of my novel package structure;

FIG. 13 is an isometric view of my novel package having another form of frangibility enhancing means;

FIG. 14 is a cross-sectional view of the package shown in FIG. 13 and taken along reference line XIV—XIV thereof; and FIG. 14A is an isometric view of still another form of the frangibility enhancing means.

Figure 1:
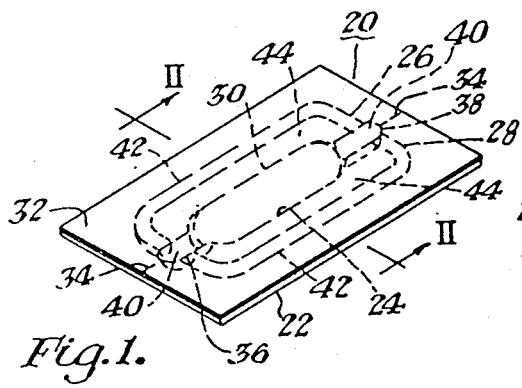
FIG. 1 is an isometric view of one form of quick-opening package arranged in accordance with my invention.
Figure 2:
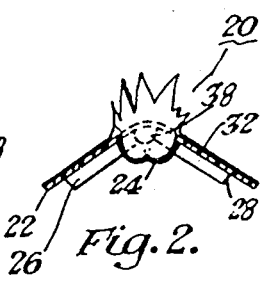
FIG. 2 is a cross-sectional view of the package in FIG. 1 along reference line II—II but showing the package in its opened condition.

Referring now more particularly to FIGS. 1 and 2 of the drawings, the exemplary package construction 20 shown therein comprises a relatively heavier layer 22 or packaging material such as a suitable plastic of requisite stiffness, in which are formed a blister 24 and a pair of reinforcing ridges 26, 28. The blister 24 can be provided with a variety of shapes and in this case is shaped to conform generally to an elongated contained item 30. The blister 24 and ridges 26, 28 can be formed simultaneously on the layer 22, for example by a form, fill and seal machine (not shown) of known construction.

Overlying the blister layer 22 is a layer 32 of a suitably frangible packaging material, which is designed to rupture when the package 20 is angulated about reference line 34 (FIG. 1) in its opened condition (FIG. 2). The frangible layer 32 can be fabricated from a very thin sheet of polyvinyl chloride or of aluminum. Depending upon a particular application of the invention, less thin and hence less frangible materials can be used for the frangible layer 32 as required by the size of package, character of the contained item, etc. Less frangible materials can be provided with a suitable line of weakening (not shown) and extending along the reference line 34. The line of weakening can be formed in a variety of ways, for example as set forth in my aforementioned copending application, and patents. A typical and desirable thickness of the frangible material 32 can be of the order of 0.5 mil.

In the arrangement of FIGS. 1 and 2, the reinforcing or stiffening ridges or members 26, 28 are of generally U-shape and are formed on the blistered layer 22 in an apposed array. In this arrangement, the ends of each ridge structure 26, 28 adjoin blister extensions 36, 38 formed at the ends respectively of the blister 24. Accordingly, when the package 20 is angulated to its open condition (FIG. 2) the junctions of the stiffening ridges 26, 28 with the sides of the blister extensions 36, 38 or other pocket or blister end portions aid in spreading the sides or upstanding wall portions of the blister extensions 36, 38. Such spreading can initiate rupture of the frangible layer 32 at a location wherein the leverage afforded by the reinforcing ridge structures 26, 28 is greatest, i.e. at one or both of the blister extensions 36, 38.

The limited bottom wall areas 40 of the blister extensions 36, 38 provide fulcrum points lying generally along the angulation fold line 34 about which the blister extension walls pivot slightly in their separating procedure. The reinforcing ridges 26, 28, together with the surrounding surfaces of the package 20, likewise pivot about the aforementioned fulcra.

The blister end portions need not necessarily be in the form of reduced or restricted extensions (blister extensions 36, 38) but such extensions are particularly useful in that their narrower contours allow the ends of the reinforcing members 26, 28 to be more closely disposed to enhance their leverage characteristic when the package 20 is opened. The effective lengths of the leverage arms inherent in the package are increased as the blister extensions 36, 38 are narrowed.

As better shown in FIG. 11 the pocket or blister simply can be elongated, and the stiffening means joined to one or both end portions thereof, without use of a discretely shaped end portion or extension. The use of a pocket extension or extensions is advantageous, however, for increasing the mechanical advantage of the package and for facilitating collapse of the blister or pocket end portion for opening purposes.

Once rupture of the frangible layer 32 has been initiated by the forces thus concentrated in the end portions of the blister or pocket, it rapidly propagates along the fold line 34, as the bight portions 42 of the ridges 26, 28 and the intervening blistered layer areas 44 likewise apply separatory forces to the upstanding wall surfaces of the main or body portion of the blister 24. The frangible layer 32, therefore, ruptures along the length of the blister 24 and its extensions 36, 38 to expose the contained item 30, which then can be readily removed. In most cases, opening of the package 20 in its inverted position, relative to that illustrated in FIGS. 1 and 2 causes the contained item 30 to pop out into a waiting container or the like.

Figure 2A:
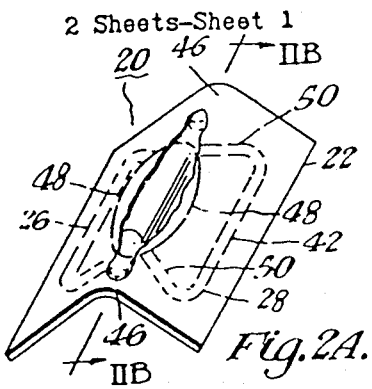
FIG. 2A is an isometric view of the package as shown in FIG. 2.

When the package 20 is angulated, as best shown in FIGS. 2 and 2A, the major portion of the blister 24 does not in actuality enter into the angulation fold. Instead, the package 20 angulates in the end portions 46 (FIG. 2A) of its blistered or backing layer 22 and to a lesser extent at the junctions 48 of the blister walls with the remainder of the blistered layer 22, in particular with its intermediate portions 44. The junction of the stiffening members 26, 28 with the blister extensions 36, 38 tends to flatten or collapse the latter, such that the blister extensions or end portions likewise become more or less angulated to permit the angulation fold to pass on either side of the main portion of the pocket or blister and the item contained therein. The spreading of the main blister walls, of course, separates the junctions 48 to aid in propagating the rupture along the rupture line 34. Depending on materials employed, this spreading of the blister walls usually tends to foreshorten the length of the main blister portion as evidenced in FIG. 2A. Such foreshortening together with the bending or folding of the blistered layer 22 around the main body of the blister 24 in most cases causes the intermediate areas 44 of the blistered layer 22 to assume a gently arcuate contour. Foreshortening of the blister, when encountered, causes the leg portions 50 of the reinforcing ribs 26, 28 to be angled toward one another.

It is established, therefore, that angulation of the package 20 takes place around the blister 24 rather than through it. Thus the domed or arched effect, inherent in the blister structure, does not offer appreciable resistance to opening or angulating forces.

The establishment of fulcra in the bottom walls 40 of the blister extensions 26, 28 likewise causes a buckling in these areas owing to package angulation including the reinforcing ridges 26, 28 and their conjunction with the blister extensions 36, 38.

The blister extensions 36, 38 desirably are of lesser depth and width than the adjoining main portion of the blister 24 to facilitate formation of the aforementioned fulcrum points in cooperation with the stiffening structures or members 26, 28 when angulated. Instead of forming the stiffening members 26, 28 integrally with the blistered layer 22, it will be appreciated that the stiffening members can be formed as discrete components and cemented or otherwise adhered to the package 20 at the illustrated locations.

Figure 2C:
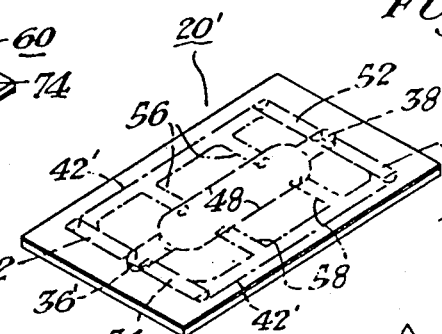
FIG. 2C is an isometric view of a modification of the package shown in the preceding figures.

The bight portions 42 of the reinforcing ribs 26, 28 aid in stiffening the package 20 longitudinally to enhance the angulation thereof at the junctions 48 between the normally flat areas of the blistered layer 22 and the walls of the blister 24. Where the blistered layer 22 is of sufficient stiffness, the bight portions 42 can be omitted as shown in FIG. 2C. In the latter arrangement, laterally extending stiffening ridges or members 52, 54 engage the sides respectively of the blister extensions 36', 38'. Spreading of the blister walls can be facilitated and enhanced by the use of additional reinforcing ridges or members 56, 58 which adjoin the main blister walls at the junctions 48'.

Bight portions 42', on the other hand can be added if additional reinforcement is desired in the package of FIG. 2C. In such case, the bight portions 42' would connect the outer ends of the endmost stiffeners 52, 54 and of the intermediate stiffeners 56, 58 when used.

Figure 3:
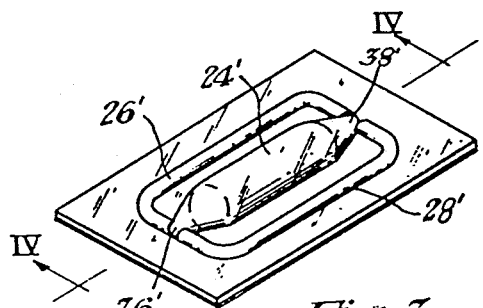
FIG. 3 is an isometric view of another form of my novel quick-opening package.
Figure 2B:
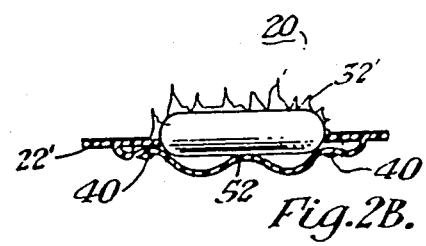
FIG. 2B is a longitudinally sectioned view of the package of FIG. 2A and taken along reference line IIB—IIB thereof.
Figure 4:
FIG. 4 is a longitudinally sectioned view of the package of FIG. 3 and taken along reference line IV—IV thereof.

In FIGS. 3 and 4, where similar reference characters with primed accents refer to similar components of the preceding figures, the sidewalls of the blister 24' are tapered inwardly in the regions of the end extensions 36', 38' of the blister 24', and the top wall is tapered downwardly to form the top wall portions 40' (as viewed in FIGS. 3 and 4) of the blister extensions 36', 38'. The blister 24' is bluntly pointed at its ends, as it were. The pointed ends of the blister 24' are adjoined by the reinforcing ridges or members 26', 28'. As the ends of the reinforcing ridges 26', 28' are more closely disposed in comparison to the FIG. 1 arrangement, a correspondingly greater leverage is afforded in the opening procedure of the package 20', which follows that set forth above with reference to the preceding figures.

Figure 5:
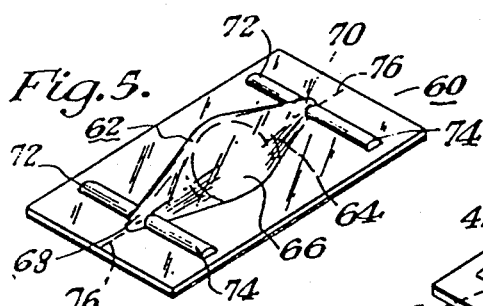
FIG. 5 is an isometric view of still another form of my quick-opening package.

The package 60 of FIG. 5 is similarly constructed save that the formed blister 62 is shaped to receive a more or less rounded item 64. The rounded body portion 66 of the blister 62 is adjoined in this example by a pair of diametrically apposed blister extensions 68, 70. Suitable reinforcing or stiffening means in turn adjoin the sidewalls of the blister extensions 68, 70. In this example, the stiffening means include a number of individual ridges 72, 74 which extend transversely of the fold line 76 of the package 60. The package 60 is opened by angulation in the manner described above with reference to the package 20 of FIGS. 1 and 2.

Figure 6:
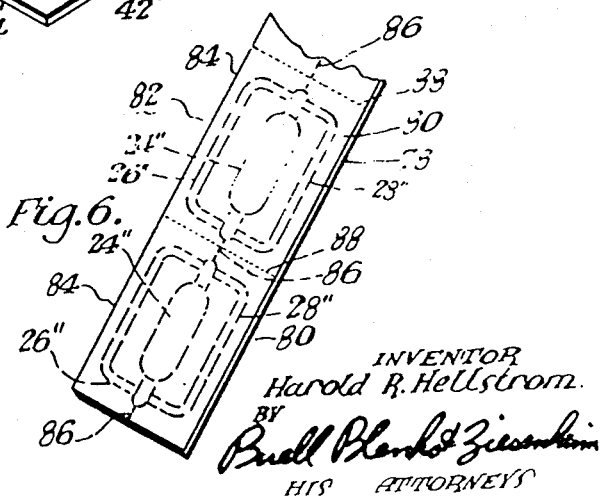
FIG. 6 is an isometric view illustrating means for mounting two or more of my novel packages on a common support.

The assembly or manufacture of a number of my novel quick opening packets in a strip formation is illustrated in FIG. 6. A continuous strip of blister material 78 is overlayed with a continuous layer 80 of frangible material and is adhered thereto by a suitable adhesive or by heat sealing. If an aluminum strip 80 is employed, one or both sides thereof can be coated with a very thin coat of a thermoplastic material for heat sealing purposes, as is known. A number of blisters 24" and reinforcing means 26", 28" can be formed at spaced intervals along the length of the strip package 82. Any one of the individual packets 84 can be angulated while forming part of the strip package 82 along the angulation fold line 86 to open an individual packet 84. Alternatively, lines of perforation 88 can be provided between adjacent pairs of the packets 84 so that a packet can be severed from the remainder of the strip prior to angulation.

Figure 7:
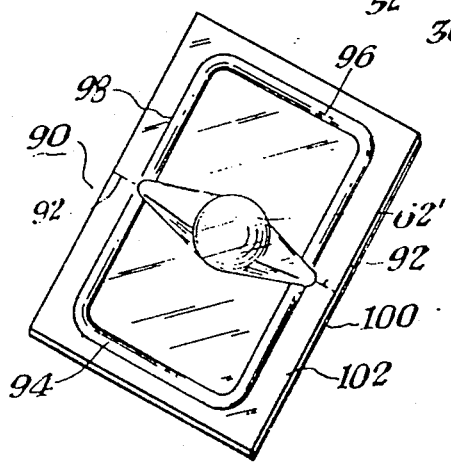
FIG. 7 is an isometric view illustrating one means for enhancing the quick-opening characteristic of my novel package.

A package 90 of similar construction to those of the preceding figures is shown in FIG. 7. The blister 62', although similar to that shown in FIG. 5, can be provided with any of the configurations illustrated herein or equivalent. In the package 90, however, the blister 62' is arranged generally transversely of an elongated package construction along with angulation fold line 92. The reinforcing ridges or members 94, 96 on the other hand, extend longitudinally of the package 90 but transversely of its fold line 92. The leg portions 98 of the ridge structures 94, 96 are elongated in the longitudinal direction of the package 90, along with the corresponding elongation of the frangible layer 100 and blister layer 102 of the package 90 to afford correspondingly increased leverage when the package 90 is angulated.

In the package 104, illustrated in FIG. 8, I provide rupture-initiating means for enhancing the frangibility characteristic of the frangible package layer 106. Similar means can be employed with other package structure described herein. One form of such rupture-initiating means includes one or more inserts 108, 110 inserted respectively into the ends of the reinforcing ridges 112, 114 which in this example are molded or formed integrally with the blistered layer 116. Desirably, the inserts 108, 110 project a short distance into the blister extensions 118, 120 and toward fulcrum points lying generally at the fold and rupture line 121 such that their inward ends are closely spaced. The inserts 108, 110 can be secured through use of a suitable cement, or if made from a thermoplastic material, by heat welding. Alternatively the adjacent walls of the blister extensions 118, 120 can be deformed inwardly in place of the inserts 108, 110 and in continuation of the reinforcing ridges 112, 114. Desirably, the inserts 108, 110 or the inwardly deformed blister extension wall portions are provided with relatively sharp or squared-off edges 122 to facilitate rupturing of the adjacent surface of the frangible layer 106, when the package 104 is angulated as in FIG. 8A. At this time, rupturing of the frangible layer 106 is initiated at one or both of the juxtaposed insert edges 122.

In the event that the blister layer 116 is relatively thin, the reinforcing ridges 112, 114, when formed integrally, can be strengthened by substantially filling the ridges 112, 114 with inserts (not shown) of a suitably rigid material. Alternatively, the inserts 108, 110 can be extended along at least the leg portions of the reinforcing ridges 112, 114 as denoted by chain outlines 124 of the inserts. In another alternative structure, the ridges 112, 114 can be formed separately as discrete members and adhered to the package 104.

As illustrated by the package 126 in FIGS. 9 and 10, rupture-initiating or frangibility enhancing inserts 108', 110' can be adhered as discrete members to the adjacent wall surfaces of the blister extensions 118', 120'. In furtherance of this purpose, the reinforcing ridges 112', 114' desirably adjoin the blister extension 118', 120' adjacent their outward ends and also adjacent the rupture aiding members 108', 110' which advantageously extend the effective leverage arms of the stiffening means 112', 114'. Instead of discrete inserts, the rupture-aiding means 108', 110' can be formed at the illustrated locations by inward deformation of the adjacent wall surfaces of the blister extensions 118', 120'. By providing relatively sharp, juxtaposed edges, 122 or 122', the inserts or wall extensions 108, 110 or 108', 110' aid in rupturing of the frangible layer 106 or 106'.

Additional rupture aiding means, for example, wall extensions or inserts 128, 130 of FIGS. 9 and 10, can be disposed along the main wall surfaces of blister 132. The rupture aids 128, 130 can be disposed generally between a pair of items 134, 136 contained within the suitably elongated blister 132 to define in general a pair of item-containing compartments 137.

With the aforedescribed inserts or wall extensions, the opening forces of the package, such as the package 138 in FIG. 11 can be controlled to a minimum without the use of discrete blister extensions, in contrast to the FIG. 1 package and others. Thus in the package 138 an excellent leverage arrangement is afforded for angulation purposes about fold line 140 although an obround blister 142 is exemplarily employed for containing a pair of items 144. The blister 142 is made correspondingly longer than the combined length of the items 144 to accommodate its junctions with reinforcing ridges 146, 148 and its wall inserts or extensions 150, 152.

When the package 138 is angulated, the adjacent free edges 122' of the wall extensions 150, 152 tend to puncture the immediate areas of the overlying frangible layer 154 of the package 138. Instead of being provided as blister wall inserts or extensions, the rupture aids 150, 152 can be provided as discrete inserts adhered to and extending from the inner surfaces of hollow reinforcing ridges 146, 148 after the manner of FIG. 8. In the latter case, the end portions of the blister 142 can be correspondingly foreshortened.

The package 156 of FIG. 12 is designed to incorporate a substantially larger blister 158 for containing a relatively large number of small items or a pair of correspondingly larger items (not shown) on either side respectively of fold line 160. The package 156 is capable of angulation about reference line 160, but, owing to the size of the blister 158, the fold line passes through at least the body portion of the blister. In furtherance of this purpose, the bottom wall 162 (as viewed in FIG. 12) of the blister 158 can be provided with a plurality of stiffening members 164 extending transversely of the fold line 160 and positioned to aid in defining the angulation fold. The ribs 164 can be formed integrally and simultaneously with the blister or pocket 158 if desired.

The blister 158 is provided with upstanding wall sections 166 for the purpose mentioned hereinafter. A pair of blister extensions 168, 170 are disposed on opposite sides of the blister body such that the fold line 160 also passes therethrough. Desirably the blister extensions 168, 170 are provided with rupture aiding means 172, 174 which function as described above. The rupture aids 172, 174 as shown can be formed by displacing the walls of the blister extensions 168, 170 inward or by discrete inserts adhered to the inner surfaces of the blister extensions 168, 170, or similar aids (not shown in FIG. 12) can be provided as taught in FIG. 8.

Each pair of rupture aids 172, 174 therefore, straddle the angulation fold line 160. When the package 156 is angulated, including the respective portions of the blistered layer 176 on either side of the reference line 160, the upstanding wall sections 166 of the blister 158 tend to angulate owing to their size and angular disposition relative to the blistered layer 176. The position of the rupture aids 172, 174 adjacent the ends of the transversely extending wall sections 166a affords effective lever arms for spreading the rupture aids 172, 174 to initiate rupture of the frangible layer 178 of the package 156.

The blister extensions 168, 170 do not require the precise length as illustrated, but should extend sufficiently beyond the rupture aids 172, 174 to permit their separation upon angulation of the package 156 without interference with the ends walls 177 of the blister extensions 168, 170. It is also contemplated that additional reinforcement means such as the aforedescribed U-shaped ridges can be utilized, as denoted by their chain outlines 180, 182 in conjunction with the reinforcement afforded by the blister wall sections 166.

Another form of opening-facilitating or rupture-initiating means is illustrated in FIGS. 13 and 14, as forming part of my novel package 184. This form of rupture-initiating means includes an opening ridge 186 extending longitudinally along the length of blister 188 and upstanding from its floor 189 including that of its extensions 190, 192. The blister extensions adjoin the ends of enforcing ridges 194, 196 which resemble, in structure and purpose, the reinforcing ridges mentioned previously. When the package of FIG. 13 is angulated (as shown in FIG. 14) the side walls of the blister 188 including its extensions are spread which tends to elevate the free edge 198 of the opening ridge 186 relative to the overlying frangible layer 200. Such elevation initiates tearing or rupturing of the frangible layer 200 which then propagates along the length of the blister opening ridge 186, which terminates, at each of its ends, short of the blister extensions or blister ends.

The opening ridge 186 divides the package 184 into compartments 202, 204 capable of containing a pair of more or less elongated items. It will also be understood that the body portion of the blister 188 can be rounded after the manner of FIG. 5, in which case the opening ridge 186 would be correspondingly shortened. It is considered further that a plurality of smaller items can be contained in either of the blister compartments 202, 204, or that a liquid or pulverulent material can be contained therein. The use of the opening ridge 186 renders spillage less likely.

An analogous arrangement is illustrated in FIG. 14A of the drawings where package 206 is provided with a blister or pocket 208 disposed in a blistered or backing layer 209 and having one or more opening prongs 210. In this example one such prong 210 is employed which can be conveniently located between a pair of contained items 212, 214. It will be understood that additional opening prongs 210 can be employed, particularly where a plurality of smaller items or a liquid or powder is contained within the blister 208 instead of the items 212, 214. The free end of the opening prong 210 is juxtaposed to frangible layer 216 so that the layer 216 ruptures over the free prong end upon spreading of the walls of the blister 208 during angulation of the package 206.

From the foregoing it will be apparent that novel and efficient forms of a quick-opening fulcrum package have been described herein. While I have shown and described certain presently preferred embodiments of the invention and have illustrated presently preferred methods of prac-

I claim:

1. A quick-opening package comprising a base member, at least one elongated pocket on said base member, a frangible layer on said base member and secured thereto generally around said pocket for enclosing an item contained therein, means strengthening generally apposed and angulatable portions of said base member, said strengthening means in addition defining an angulation fold region extending generally between said base member portions, said strengthening means including stiffening means secured to said base member and to said pocket but only at an end portion thereof to aid in spreading said pocket to develop rupturing forces in said frangible layer upon angulation of said package and to concentrate said forces at said pocket end portion.

2. The combination according to claim 1 wherein said end portion is an extension of said pocket having a reduced dimension relative to a similar dimension of said pocket for further concentration of said forces.

3. The combination according to claim 2 wherein said pocket and said pocket extensions are formed transversely of an elongated base member and frangible layer, and said stiffening means are elongated in the longitudinal direction of said base member to afford correspondingly greater leverage for angulation of said package.

4. The combination according to claim 1 wherein said stiffening means are extended to points within said pocket and juxtaposed to said frangible layer such that said stiffening means bearingly contact said layer upon said angulation to aid in rupturing said frangible layer.

5. The combination according to claim 1 wherein rupture aiding members are mounted on wall surfaces of said pocket adjacent the junction thereof with said stiffening means to aid in rupturing said frangible layer.

6. The combination according to claim 5 wherein said pocket is elongated and additional rupture aiding means are secured along the length thereof to facilitate rupturing said frangible layer and for defining at least two item containing compartments within said pocket.

7. The combination according to claim 1 wherein said strengthening means include a plurality of reinforcing ridges on said package and extending laterally outwardly from said pocket and transversely of said fold region line.

8. The combination according to claim 7 wherein at least one of said ridges on each side of said pocket are connected by a bight ridge portion in a U-shaped configuration.

9. The combination according to claim 1 wherein a plurality of said pockets and individual strengthening means therefor are formed at spaced locations along an elongated base member and frangible layer.

10. The combination according to claim 1 wherein a wall area of said pocket is provided with stiffening means forming at least part of said strengthening means.

11. The combination according to claim 1 wherein upstanding wall surfaces of said pocket are disposed substantially normal to said base member and said frangible layer to form at least part of said strengthening means.

12. The combination according to claim 1 wherein rupture initiating means are mounted on an inner wall surface of said pocket and are juxtaposed to said frangible layer so as to contact bearingly said layer upon angulation of said package to initiate rupture therein.

13. The combination according to claim 12 wherein said pocket is elongated and said rupture initiating means include at least one pointed or edged member disposed generally between a pair of items contained within said pocket.

14. The combination according to claim 12 wherein said rupture initiating means include a pair of pointed or edged members extended from apposing sides of said pocket toward said angulation fold line for lengthening effective leverage arms of said package.

15. The combination according to claim 1 wherein said strengthening means include a pair of apposed, U-shaped ridge members adhered to one of said layers and together substantially spacedly surrounding said pocket, the ends of each ridge member being adjoined respectively to opposite end portions of said pocket.

16. The combination according to claim 1 wherein a wall portion of said pocket is shaped to aid in spreading said pocket upon said angulation.

17. The combination according to claim 1 wherein said stiffening means extend transversely of said fold region.

18. The combination according to claim 1 wherein said stiffening means are so secured to both end portions of said pocket for concentration of said rupturing forces at each end portion of said pocket.

19. A quick-opening sealed package comprising a base member having a pocket thereon, a frangible layer secured to said base member and sealed thereto about said pocket for enclosing an item contained in said pocket, means strengthening angulatable portions of said base member, said strengthening means defining an angulation fold region extending generally between said angulatable portions, said pocket having a restricted extension at at least one side of said pocket, and said fold region intersecting said pocket extension to concentrate opening forces at said extension and to initiate rupturing of said layer upon angulation of said portions.

20. The combination according to claim 19 wherein said extension is shallower than said pocket for a further concentration of opening forces.

21. The combination according to claim 19 wherein said strengthening means include stiffening means secured to said base member and to said pocket extension to enhance said opening forces by increased distortion of said extension.

22. The combination according to claim 20 wherein means for initiating rupture of said frangible layer are mounted within said extension.

23. The combination according to claim 19 wherein a pair of said pocket extensions are disposed respectively at opposed sides of said pocket, said extensions both intersecting said fold region and being shaped to deform upon angulation of said portions to divert folds produced by said angulation generally around the main body of said pocket to aid in spreading edges and adjacent wall surfaces of said pocket to complete rupture of said frangible layer.

References Cited

UNITED STATES PATENTS

| | | | |
|---|---|---|---|
| 2,874,836 | 2/1959 | Wertepny, Jr. | 206—80 A UX |
| 3,054,503 | 9/1962 | Hartman, Jr. et al. | 206—78 B X |
| 3,207,299 | 9/1965 | Sparks | 206—42 |
| 3,521,805 | 7/1970 | Ward | 206—56 AA UX |
| 3,472,367 | 10/1969 | Hellstrom | 206—56 AA |
| 3,472,368 | 10/1969 | Hellstrom | 206—56 AA |
| 3,540,579 | 11/1970 | Hellstrom | 206—56 AA |

JOSEPH R. LECLAIR, Primary Examiner

S. E. LIPMAN, Assistant Examiner

U.S. Cl. X.R.

206—42, 78 B